US007841363B1

(12) United States Patent
Suharno

(10) Patent No.: US 7,841,363 B1
(45) Date of Patent: Nov. 30, 2010

(54) MODULAR UPGRADEABLE PNEUMATIC/HYDRAULIC MANIFOLD

(75) Inventor: Anwar Suharno, Lincolnshire, IL (US)

(73) Assignee: SPX Corporation, Charlotte, NC (US)

( * ) Notice: Subject to any disclaimer, the term of this patent is extended or adjusted under 35 U.S.C. 154(b) by 804 days.

(21) Appl. No.: 11/730,741

(22) Filed: Apr. 3, 2007

(51) Int. Cl.
*F16K 11/10* (2006.01)

(52) U.S. Cl. ...................................... 137/884; 137/269

(58) Field of Classification Search ................. 137/269, 137/884; 62/292
See application file for complete search history.

(56) References Cited

U.S. PATENT DOCUMENTS 5,439,026 A * 8/1995 Moriya et al. ............... 137/486
5,605,179 A * 2/1997 Strong et al. ................ 137/884
5,819,782 A * 10/1998 Itafuji ........................ 137/240
5,887,623 A * 3/1999 Nagai et al. ................. 137/884
5,996,369 A * 12/1999 Hirota ....................... 62/324.6
6,065,494 A * 5/2000 Thomsen et al. ............ 137/552
6,247,325 B1 * 6/2001 Muston et al. ................ 62/292
6,273,139 B1 * 8/2001 Ohmi et al. ................. 137/884
6,834,669 B2 * 12/2004 Seyfarth ..................... 137/354
6,883,540 B2 * 4/2005 Bankstahl et al. ........... 137/594
6,892,764 B2 * 5/2005 Rodrigues et al. ........... 137/884
7,631,442 B2 * 12/2009 Kost et al. ...................... 37/234

* cited by examiner

*Primary Examiner*—John Fox
(74) *Attorney, Agent, or Firm*—Baker & Hostetler LLP

(57) ABSTRACT

An upgradeable A/C maintenance system and methodology is provided including one or more modular manifolds for mounting and fluidly connecting several components. Embodiments include first and second manifolds, each for removably mounting a plurality of components, and each comprising an internal passage for fluidly connecting at least two of the plurality of components to each other, and a port for fluidly connecting the internal passage to an external surface of the first manifold. The first and second manifolds are removably attachable to each other such that their respective ports fluidly communicate with each other. The first manifold provides a first functionality for the system when the second manifold is not attached to the first manifold, and the second manifold provides a second functionality different from the first functionality when the second manifold is attached to the first manifold.

14 Claims, 7 Drawing Sheets

MODULAR UPGRADEABLE PNEUMATIC/HYDRAULIC MANIFOLD

TECHNICAL FIELD

The present disclosure relates to pneumatic and hydraulic manifolds for fluidly connecting pluralities of components into circuits. The present disclosure has particular applicability to refrigerant handling systems and to systems for maintaining air conditioning (A/C) systems.

BACKGROUND ART

Conventional A/C maintenance systems, such as recharging/recycling systems for vehicle air conditioners, are either manual or automatic. One exemplary function performed by A/C maintenance systems is refrigerant charging. Such systems all include a device, such as a microprocessor, for monitoring a refrigerant charge going into the vehicle A/C system. The automatic systems shut off refrigerant flow to the vehicle automatically when the correct charge is achieved, typically by causing electric solenoid valve(s) to close. The manual systems typically display a notice on a display screen and/or a gauge indicating to the technician that the refrigerant flow valve(s) should be shut manually, usually via a handle on the front panel of the system's cabinet.

The above-described A/C maintenance systems are not upgradeable from manual to automatic. They are also not easily upgradeable to add additional functionality.

There exists a need for an apparatus and methodology for enabling A/C maintenance systems to be upgraded or customized as desired by the end user to add functions and/or to automate manual functions.

SUMMARY

An advantage of the present disclosure is an upgradeable pneumatic/hydraulic valve manifold that allows modules to be added to transform an A/C maintenance system from manual, to semiautomatic, to automatic operation.

Additional advantages and other features of the present disclosure will be set forth in part in the description which follows and in part will become apparent to those having ordinary skill in the art upon examination of the following or may be learned from the practice of the disclosure. The advantages may be realized and obtained as particularly pointed out in the appended claims.

According to the present disclosure, the foregoing and other advantages are achieved in part by a modular system comprising a first manifold for removably mounting a first plurality of components, the first manifold comprising an internal passage for fluidly connecting at least two of the first plurality of components to each other when they are mounted to the first manifold, and a port for fluidly connecting the internal passage to an external surface of the first manifold; and a second manifold for removably mounting a second plurality of components, the second manifold comprising an internal passage for fluidly connecting at least two of the second plurality of components to each other when they are mounted to the second manifold, and a port fluidly connecting the internal passage to an external surface of the second manifold. The first and second manifolds are removably attachable to each other such that their respective ports fluidly communicate with each other. The first manifold provides a first functionality for the system when the second manifold is not attached to the first manifold, and the second manifold provides a second functionality different from the first functionality when the second manifold is attached to the first manifold.

Another aspect of the disclosure is a method comprising providing a first manifold for removably mounting a first plurality of components, the first manifold comprising an internal passage for fluidly connecting at least two of the first plurality of components to each other when they are mounted to the first manifold, and a port for fluidly connecting the internal passage to an external surface of the first manifold; providing a second manifold for removably mounting a second plurality of components, the second manifold comprising an internal passage for fluidly connecting at least two of the second plurality of components to each other when they are mounted to the second manifold, and a port fluidly connecting the internal passage to an external surface of the second manifold; and attaching the first and second manifolds to each other such that their respective ports fluidly communicate with each other. The first manifold provides a first A/C maintenance functionality for the system when the second manifold is not attached to the first manifold, and the second manifold provides a second A/C maintenance functionality different from the first A/C maintenance functionality when the second manifold is attached to the first manifold.

Additional advantages of the present disclosure will become readily apparent to those skilled in this art from the following detailed description, wherein only exemplary embodiments of the present disclosure are shown and described, simply by way of illustration of the best mode contemplated for carrying out the disclosed methodology and apparatus. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein.

DETAILED DESCRIPTION

Conventional A/C maintenance systems cannot be upgraded from manual operation to automatic operation, thereby reducing their flexibility and requiring the user to choose between a manual system or a more expensive automatic system at the time of purchase. The present disclosure addresses and solves this problem of conventional A/C maintenance systems.

According to the present disclosure, an upgradeable A/C maintenance system includes one or more modular manifolds for mounting and fluidly connecting several components. Each modular manifold has components for providing a different level of functionality to the system. The modular manifolds and their associated components are added, as needed, to the maintenance system by attaching them to the system's existing manifolds. Thus, by "stringing together" modular manifolds, parts can be added to easily convert the system from a less expensive unit, such as a manual unit, to a semi-automatic or automatic unit.

Figure 1:
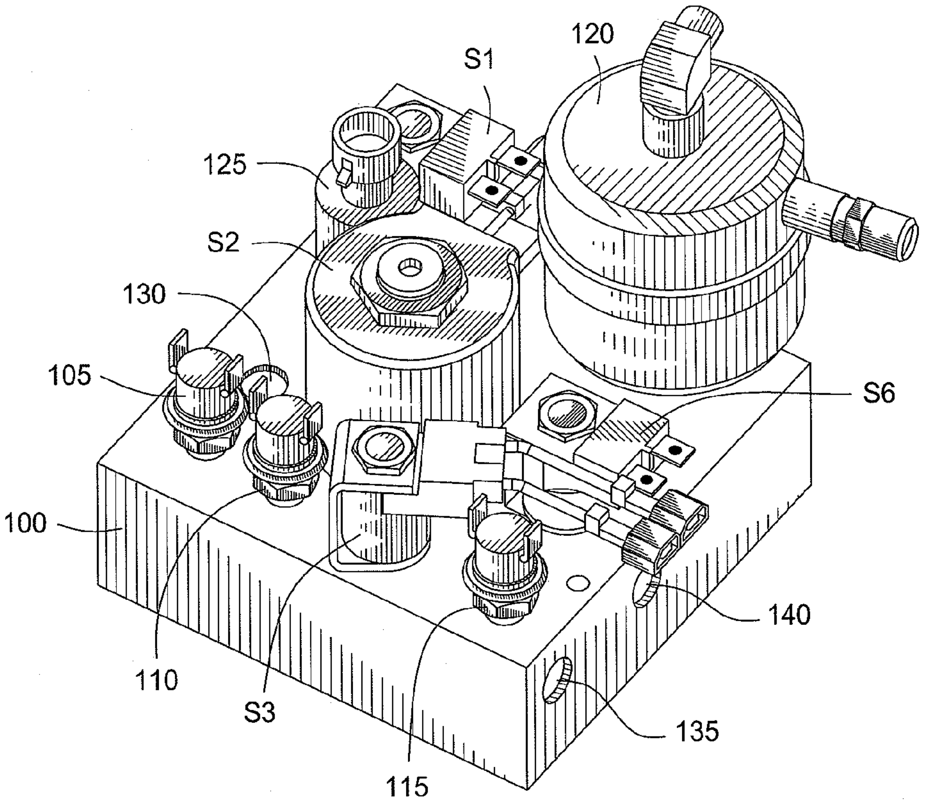
FIG. 1 (PRIOR ART)
FIG. 1 is a perspective view of a conventional manifold.

Conventional A/C maintenance systems typically employ a manifold, such as an aluminum block having internal passages, to mount certain components and fluidly connect them to each other to form a pneumatic circuit. A manifold of conventional design is shown in FIG. 1 as reference numeral 100. Mounted to manifold 100 via threaded fittings are electrical solenoids S1, S2, S3, and S6, a vacuum switch 105, a low pressure switch 110, a high pressure switch 115, an oil separator 120, and a pressure transducer 125. Manifold 100 includes ports 130, 135, and 140 for attaching hoses and/or pipes, and further includes internal passages (not shown) for fluidly connecting the above-described solenoids and other components mounted on manifold 100 to each other and to ports 130, 135, 140 as appropriate to create the desired circuit(s) for A/C maintenance functionality.

Figure 2A:
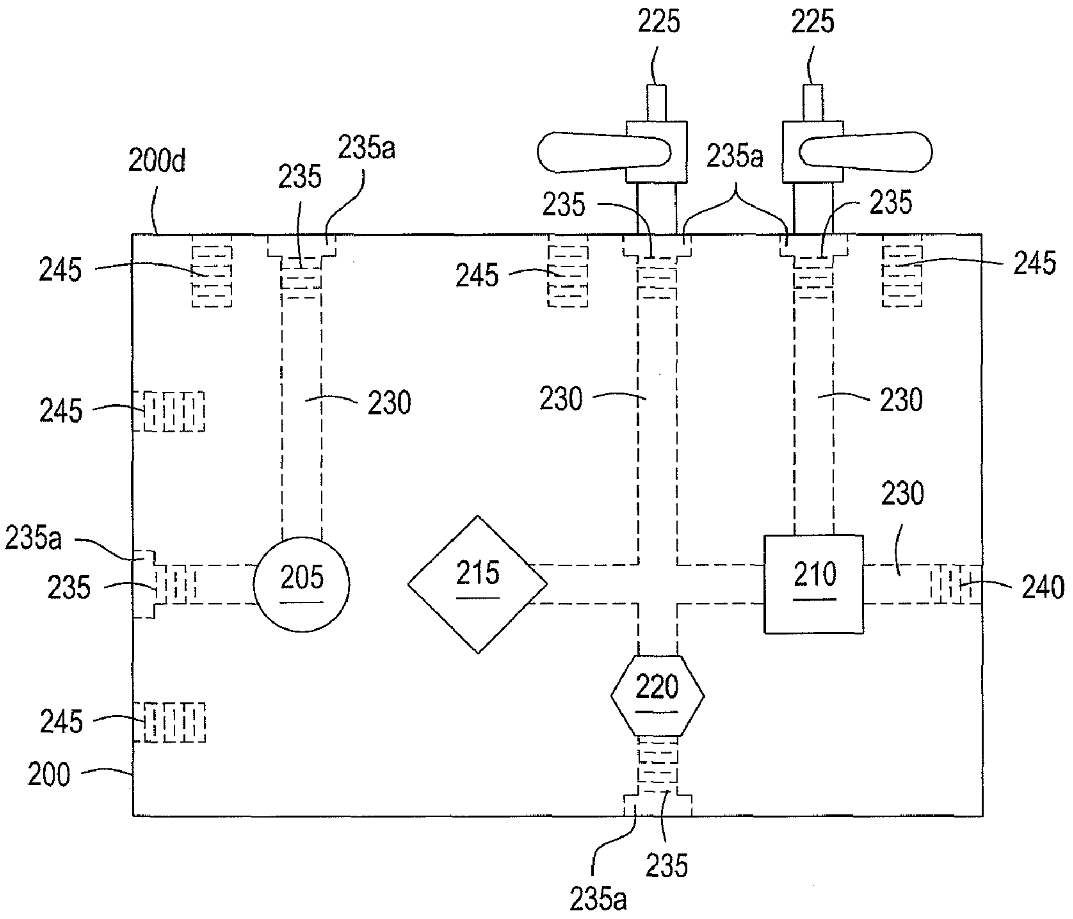
FIGS. 2A and 2B are top and side schematic views, respectively, of a first manifold according to the present disclosure.
Figure 2B:
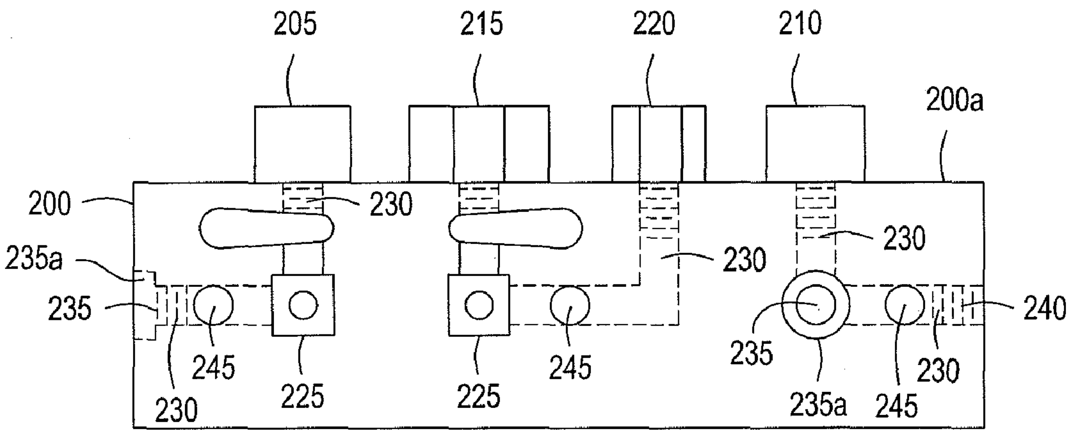

An embodiment will now be described in detail with reference to FIGS. 2A-4A. Referring now to FIGS. 2A-2B, a first manifold 200 is for removably mounting a first plurality of components, including a first solenoid valve 205, a temperature switch 210, a high-pressure cutoff switch 215, a check valve 220, and manually operatable valves 225, as by conventional screw mounting. First manifold 200 is a single piece, and has internal passages 230; e.g., formed by drilling or casting. Passages 230 fluidly connect at least two of the first plurality of components 205-225 to each other when they are mounted to first manifold 200.

First manifold 200 also has ports 235, 240 for fluidly connecting the internal passages 230 to an external surface of first manifold 200. Ports 235, 240 have screw threads for facilitating connecting hoses, tubes, and components to them. Manifold 200 and components 205-225 provide at least one A/C maintenance function when certain of the ports 235, 240 are connected to outside components of the A/C maintenance system (not shown) in a conventional manner. For example, port 240 is connectable to a compressor, port 235 adjacent check valve 220 is connectable to a condenser, and port 235 adjacent solenoid valve 205 is connectable to an accumulator. At least one side 200*a* of first manifold 200 on which ports 235 are disposed is substantially flat, and has blind threaded holes 245. Ports 235 have grooves 235*a* surrounding them to accommodate conventional O-rings for sealing manifold 200 to another manifold, as will be explained hereinbelow.

Figure 3A:
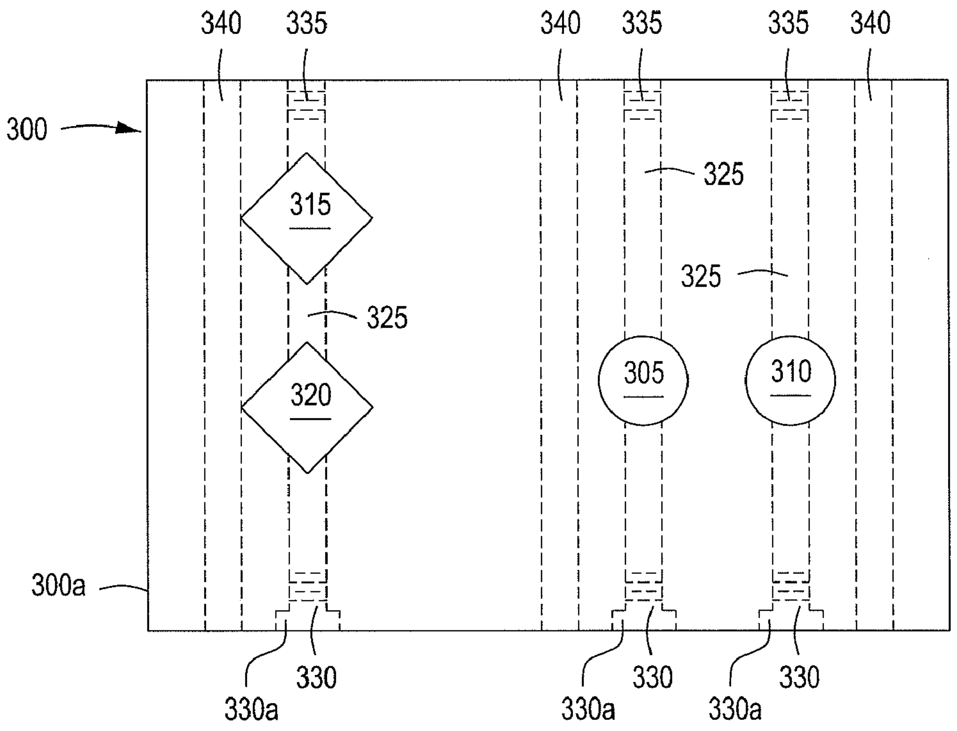
FIGS. 3A and 3B are top and side schematic views, respectively, of a second manifold according to the present disclosure.
Figure 3B:
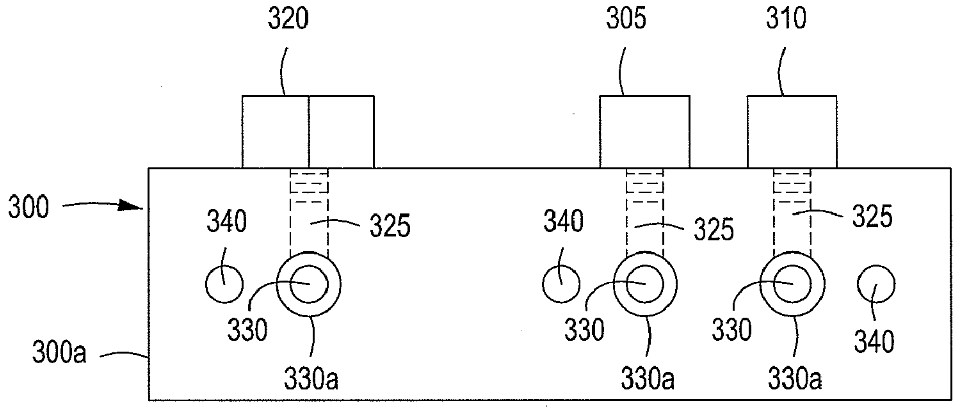

Referring now to FIGS. 3A-3B, a second manifold 300 is for removably mounting a second plurality of components, including a second solenoid valve 305, a third solenoid valve 310, a low pressure switch 315, and a vacuum switch 320, as by conventional screw mounting. Second manifold 300 is a single piece, and has internal passages 325; e.g., formed by drilling or casting. Passages 325 fluidly connect at least two of the first plurality of components 305-320 to each other when they are mounted to second manifold 300.

Second manifold 300 also has ports 330, 335 for fluidly connecting the internal passages 325 to an external surface of second manifold 300. Ports 330, 335 have screw threads for facilitating connecting hoses, tubes, and components to them. Second manifold 300 has through holes 340 that correspond to blind holes 245 in first manifold 200. At least one side 300*a* of second manifold 300 on which ports 330 are disposed is substantially flat, and ports 330 have grooves 330*a* surrounding them to accommodate conventional O-rings for sealing manifold 300 to first manifold 200, as will be explained hereinbelow.

Figure 4A:
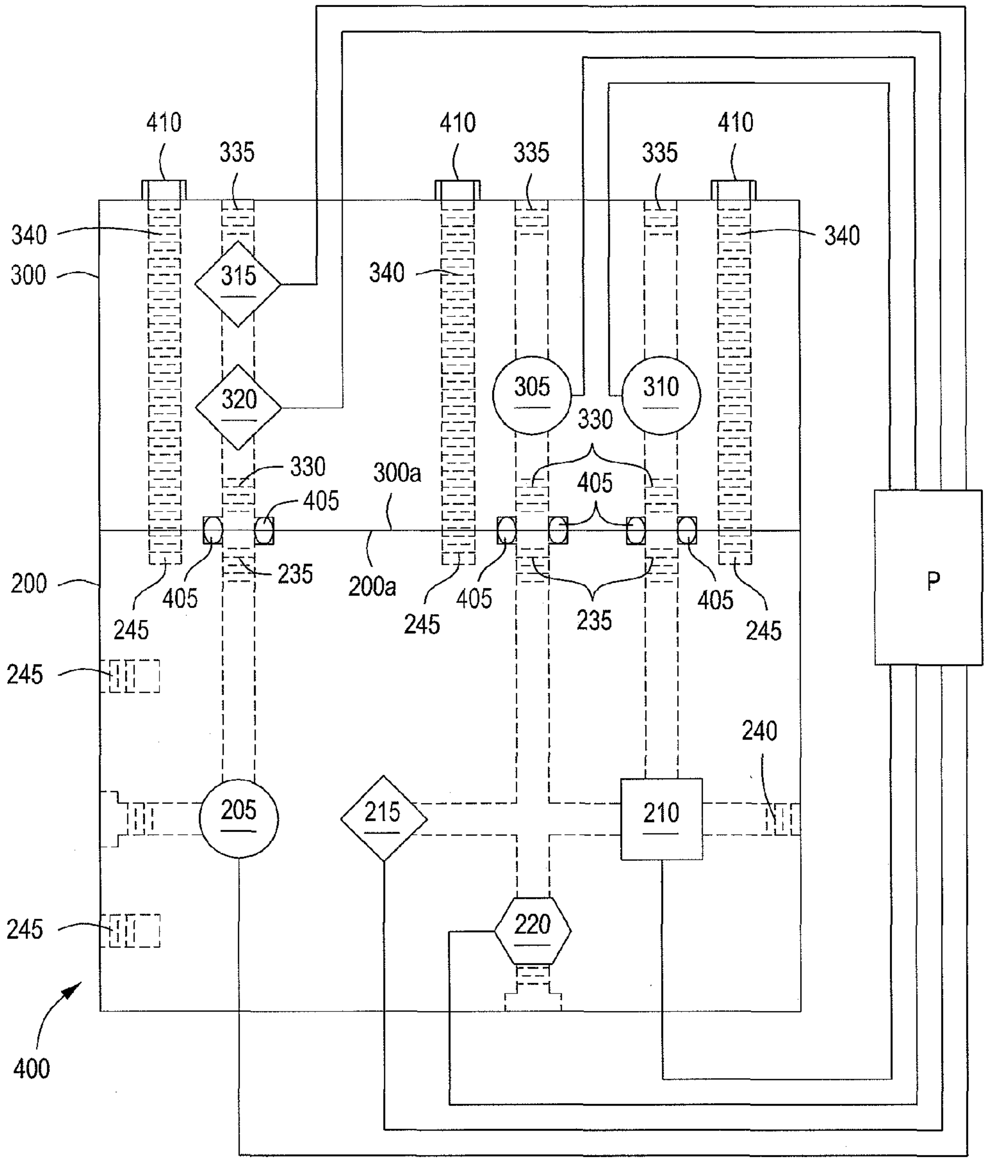
FIG. 4A is a top schematic view of an A/C maintenance system according to one embodiment of the present disclosure.

Referring now to FIG. 4A, first manifold 200 and second manifold 300 are shown attached to each other such that their respective ports 235, 330 fluidly communicate with each other. Note manually operatable valves 225 are removed from first manifold 200 prior to attaching first and second manifolds 200, 300 to each other. Manually operatable valves 225 are effectively replaced by solenoid valves 305, 310 of second manifold 300. Second manifold 300 and components 305-320 provide at least one additional A/C maintenance function to that of first manifold 200 when it is connected to first manifold 200, and certain of the ports 335 are connected to outside components of the A/C maintenance system (not shown) in a conventional manner. For example, the function of automatic operation is added via solenoid valves 305, 310. The components 205-220 mounted on first manifold 200, and the components 305-320 mounted on second manifold 300, are electrically connected via conventional wiring to a processor P, such as a conventional computer, for automatic control of at least solenoid valves 205, 305, 310. Other conventional functions related to A/C maintenance can also be controlled by processor P.

In the embodiment shown in FIG. 4A, flat surfaces 200*a*, 300*a* on which ports 235, 330 are disposed abut each other such that the ports fluidly communicate with each other. O-ring seals 405 fit in grooves 235*a*, 330*a*, between ports 235, 330, and fasteners 410 (such as conventional hex bolts) extend through holes 340 and screw into threaded holes 245 to provide a substantially leak-free seal between first and second manifolds 200, 300.

Figure 4B:
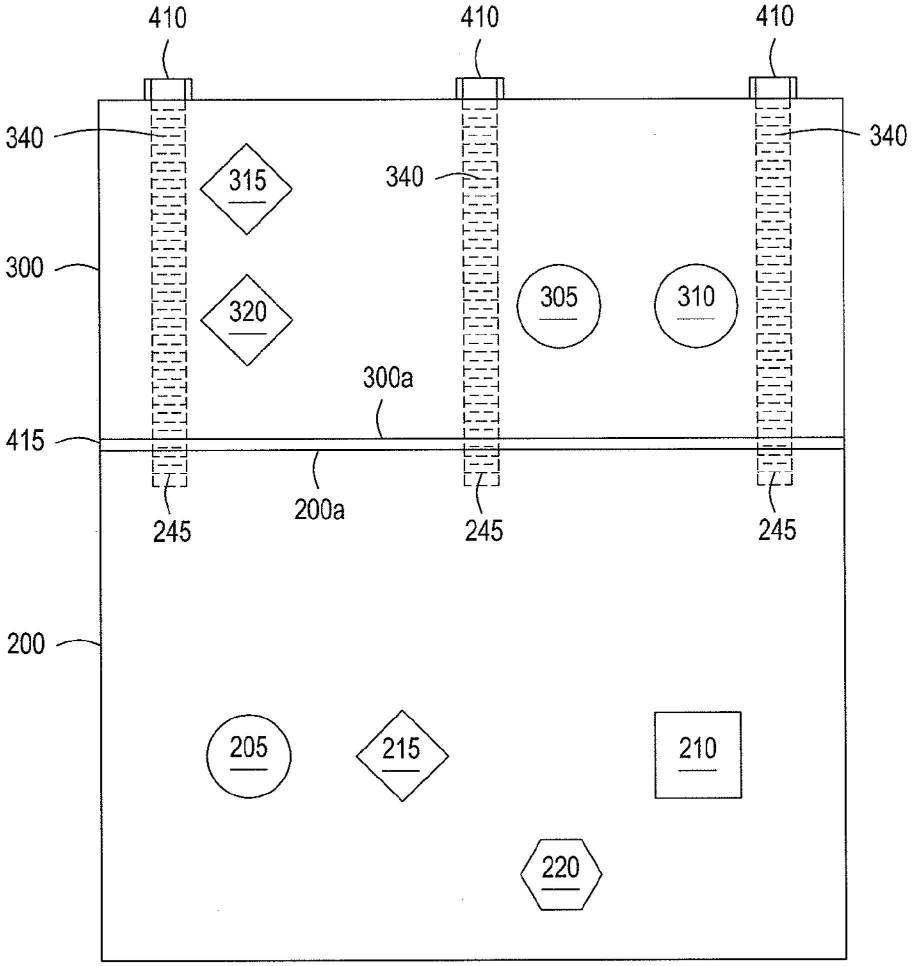
FIG. 4B is a top schematic view of an A/C maintenance system according to another embodiment of the present disclosure.

In the embodiment shown in FIG. 4B, flat surfaces 200*a*, 300*a* on which ports 235, 330 are disposed abut each other such that the ports fluidly communicate with each other, with a gasket 415 between flat surfaces 200*a*, 300*a*. Fasteners 410 (such as conventional hex bolts) extend through holes 340 and screw into threaded holes 245 to provide a substantially leak-free seal between first and second manifolds 200, 300. If manifolds 200 and 300 are to be connected to each other using gasket 415, grooves 235*a*, 330*a* are unnecessary. The apparatus of FIGS. 4A and 4B are otherwise substantially identical, although certain elements have not been duplicated in FIG. 4B for the sake of simplicity.

Figure 4C:
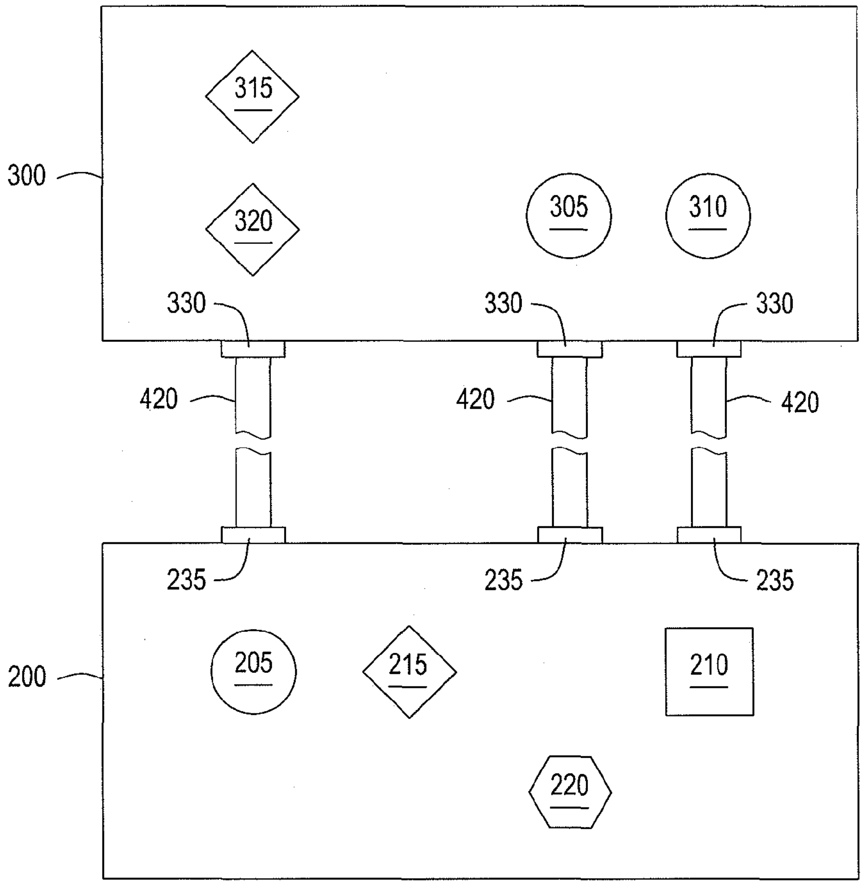
FIG. 4C is a top schematic view of an A/C maintenance system according to yet another embodiment of the present disclosure.

In the embodiment shown in FIG. 4C, ports 235 of first manifold 200 and ports 330 of second manifold 300 are fluidly connected in a substantially leak-free manner via conventional hoses or pipes 420 that screw into the threads in respective ports 235, 330. If manifolds 200 and 300 are to be connected via hoses or pipes 420, then threaded holes 245, through holes 340, and grooves 235*a*, 330*a* are not necessary. The apparatus of FIG. 4C is otherwise substantially identical to that of FIG. 4A, although certain elements have not been duplicated in FIG. 4C for the sake of simplicity.

Figure 5:
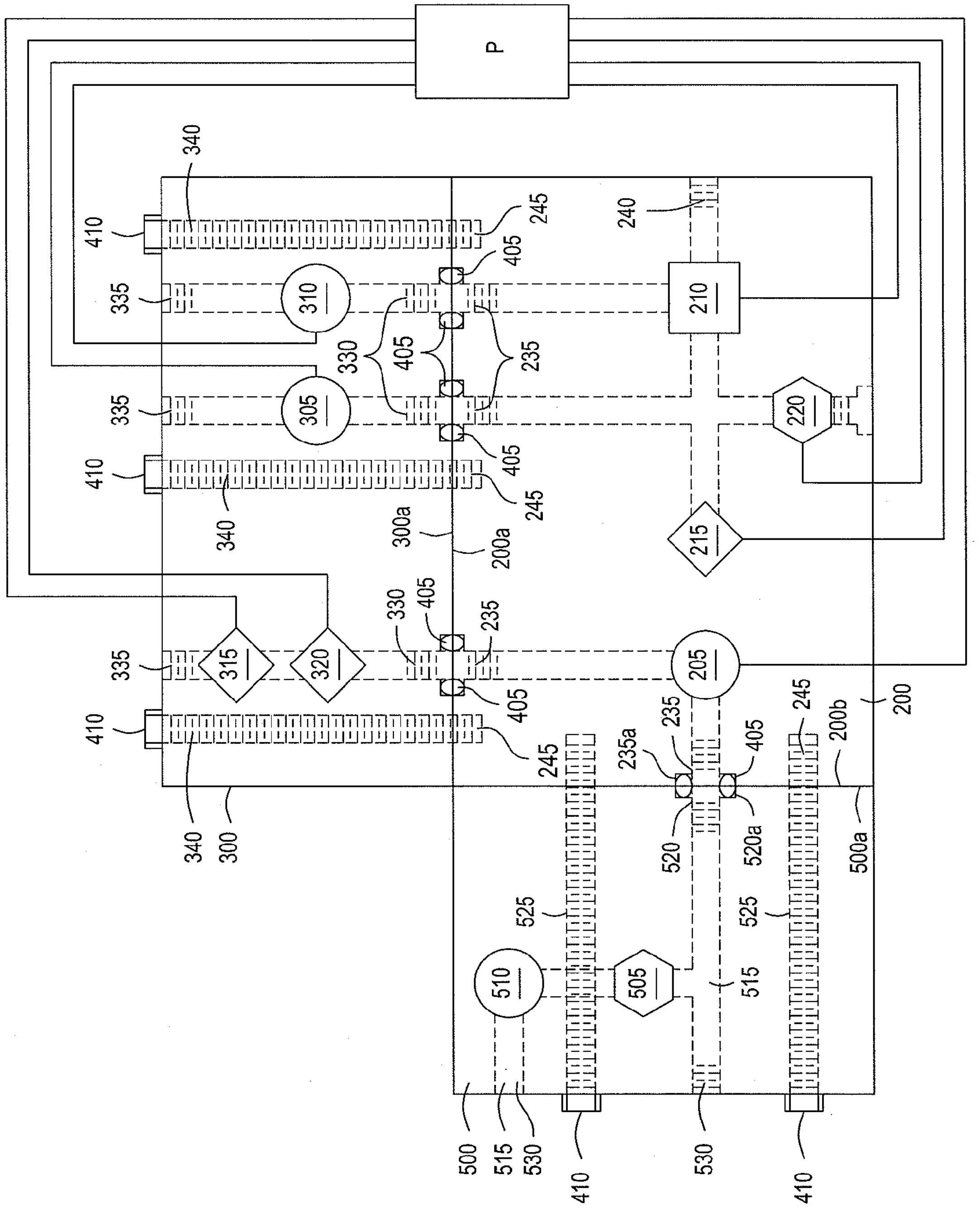
FIG. 5 is a top schematic view of an A/C maintenance system according to still another embodiment of the present disclosure.

Referring now to FIG. 5, a third manifold 500 is for removably mounting a third plurality of components, including a fourth solenoid valve 510 and a check valve 505, as by conventional screw mounting. Third manifold 500 is a single piece, and has internal passages 515; e.g., formed by drilling or casting. Passages 515 fluidly connect at least two of the third plurality of components 505, 510 to each other when they are mounted to third manifold 500.

Third manifold 500 also has ports 520, 530 for fluidly connecting the internal passages 515 to an external surface of third manifold 500. Ports 520, 530 have screw threads for facilitating connecting hoses, tubes, and components to them. Third manifold 500 has through holes 525 that correspond to blind holes 245 in first manifold 200. At least one side 500*a* of third manifold 500 on which port 520 is disposed is substantially flat, and port 520 has a groove 520*a* surrounding it to accommodate a conventional O-ring for sealing manifold 500 to first manifold 200, as will be explained hereinbelow.

First manifold 200 and third manifold 500 are shown attached to each other in FIG. 5, such that their respective ports 235, 520 fluidly communicate with each other. Third manifold 500 and components 505, 510 provide at least one additional A/C maintenance function to that of first manifold 200 when it is connected to first manifold 200, and certain of the ports 530 are connected to outside components of the A/C maintenance system (not shown) in a conventional manner. For example, an additional automatic function is added via solenoid valve 510, which is electrically connected via conventional wiring to processor P.

Flat surfaces 200*b*, 500*a* on which ports 235, 520 are disposed abut each other such that the ports fluidly communicate with each other. An O-ring seal 405 fits in grooves 235*a*, 520*a*, between ports 235, 520, and fasteners 410 (such as conventional hex bolts) extend through holes 525 and screw into threaded holes 245 to provide a substantially leak-free seal between first and third manifolds 200, 500. Instead of the O-ring seal arrangement shown in FIG. 5, those skilled in the art will appreciate that a gasket seal or a hose or pipe can be used to connect first and third manifolds 200, 500, analogous to the arrangements shown in FIGS. 4B and 4C.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the disclosure. However, it should be recognized that the disclosure can be practiced without resorting to the details specifically set forth. In other instances, well known structures have not been described in detail, in order not to unnecessarily obscure the present disclosure.

Only exemplary embodiments of the present disclosure are shown and described herein. It is to be understood that the present disclosure is capable of use in various other combinations and environments and is capable of changes or modifications within the scope of the inventive concepts as expressed herein.

What is claimed is:

1. A modular system comprising:

a first manifold for removably mounting a first plurality of components, the first manifold comprising an internal passage for fluidly connecting at least two of the first plurality of components to each other when they are mounted to the first manifold, and a port for fluidly connecting the internal passage to an external surface of the first manifold; and a second manifold for removably mounting a second plurality of components, the second manifold comprising an internal passage for fluidly connecting at least two of the second plurality of components to each other when they are mounted to the second manifold, and a port fluidly connecting the internal passage to an external surface of the second manifold;

wherein the first and second manifolds are removably attachable to each other such that their respective ports fluidly communicate with each other;

wherein the first manifold provides a first functionality for the system when the second manifold is not attached to the first manifold; and wherein the second manifold provides a second functionality different from the first functionality when the second manifold is attached to the first manifold, wherein the first manifold further comprises a removeably connected manually operatable valve configured to detach when the second manifold is attached to the first manifold and an automatic valve in the second manifold is configured to perform the valve function of the manually operatable valve when the second manifold is attached to the first manifold.

2. The system of claim 1, comprising a third manifold for mounting a third plurality of components, the third manifold comprising an internal passage for fluidly connecting at least two of the third plurality of components to each other when they are mounted to the third manifold, and a port fluidly connecting the internal passage to an external surface of the third manifold;

wherein the third manifold is removably attachable to the first or second manifold, such that there respective ports fluidly communicate with each other; and wherein the third manifold provides a third functionality different from the first and second functionalities when the third manifold is attached to the first or second manifold.

3. The system of claim 2, wherein the first, second and third functionalities each comprise an A/C maintenance function.

4. The system of claim 2, wherein the third manifold has a manifold body consisting of single piece.

5. The system of claim 1, wherein each of the first and second manifolds have a flat surface on which their respective port is disposed, which flat surfaces are for abutting each other such that the ports fluidly communicate with each other; and wherein the flat surfaces are fastened together via fasteners to provide a substantially leak-free seal therebetween.

6. The system of claim 5, further comprising a gasket between the flat surfaces of the first and second manifolds.

7. The system of claim 5, further comprising an O-ring between the ports of the first and second manifolds.

8. The system of claim 1, wherein the ports of the first and second manifolds are fluidly connectible to each other by a pipe or a hose.

9. The system of claim 1, wherein the second plurality of components includes a solenoid valve.

10. The system of claim 9, further comprising a processor, wherein the solenoid valve is connected to the processor for automatic control of the valve.

11. The system of claim 1, wherein the first and second functionalities each comprise an A/C maintenance function.

12. The system of claim 11, wherein the first plurality of components includes a first solenoid valve, a temperature switch, a high-pressure cutoff switch, and a check valve, and the second plurality of components includes a second solenoid valve, a vacuum switch, and a low-pressure switch.

13. The system of claim 12, further comprising a microprocessor, wherein the first and second solenoid valves are connected to the microprocessor for automatic control of the valves.

14. The system of claim 1, wherein the first and second manifolds each consist of a single piece.

* * * * *